R. R. ROMNEY.
FLEXIBLE SHAFT COUPLING.
APPLICATION FILED FEB. 17, 1920.
1,368,574.
Patented Feb. 15, 1921.
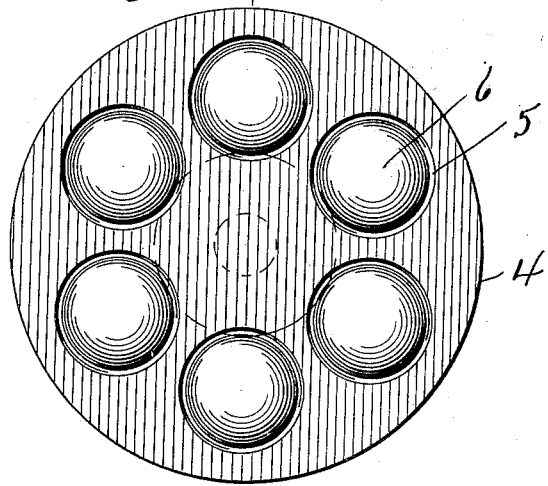
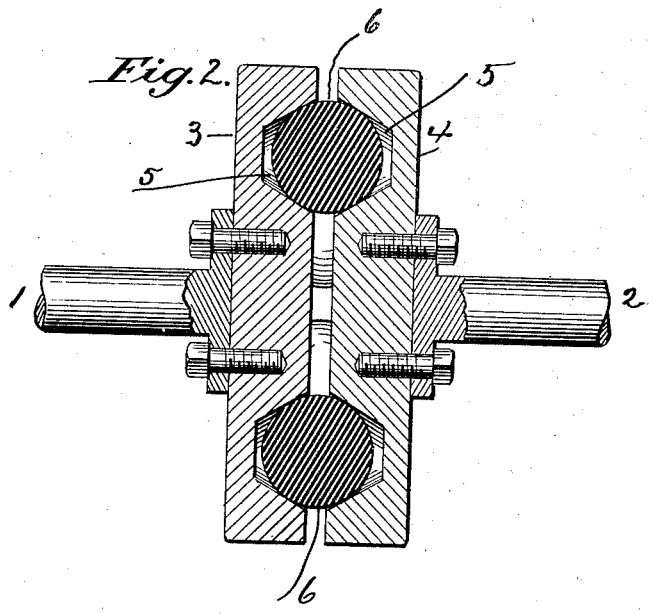
Inventor:
Richard R. Romney
Att'y.

UNITED STATES PATENT OFFICE.

RICHARD R. ROMNEY, OF SEATTLE, WASHINGTON.

FLEXIBLE SHAFT-COUPLING.

1,368,574.  Specification of Letters Patent.  Patented Feb. 15, 1921.

Application filed February 17, 1920. Serial No. 359,332.

*To all whom it may concern:*

Be it known that I, RICHARD R. ROMNEY, a citizen of the United States, residing at Seattle, in the county of King, State of Washington, have invented certain new and useful Improvements in Flexible Shaft-Couplings, of which the following is a description, reference being had to the accompanying drawing and to the figures of reference marked thereon.

My invention relates to flexible shaft couplings.

The object of the invention is to provide a flexible shaft coupling composed of two parallel disks having opposed pockets on their adjacent faces in which are placed rubber balls which flexibly connect the two disks.

This object I accomplish by the construction shown in the accompanying drawing, in which:

Figure 1 is a face view of the inner side of one of the coupling disks and the rubber balls.

Fig. 2 is a cross sectional view through the coupling.

The two shaft sections 1 and 2 are provided at their abutting ends with the disks 3 and 4 respectively and these disks are provided on their inner faces with opposed circular pockets 5 preferably of truncated conical form. Within these pockets are placed the rubber balls 6. It will be seen that the balls form a yielding connection between the two disks; the action being a shearing action under rotary motion, and in the event of longitudinal thrust the balls will be compressed and afford a cushioning movement.

The conical form of the pockets prevents the balls from contacting with their inner walls or bases and so tends to prevent binding of the balls in the pockets and also permits the balls to rotate under the vibration of the shaft sections and disks. This rotation of the balls prevents undue wear thereof, as fresh surfaces are constantly presented to those portions of the pockets with which the balls contact.

The disks are spaced apart as shown and the balls connect the two disks as shown.

What I claim is:

1. A shaft coupling comprising two parallel spaced members or disks provided in their inner faces with opposed circular pockets and rubber balls connecting the opposed pockets and free to turn therein; the balls cushioning the coupling disks with a shearing action under rotary movement and also cushioning by compression under a thrust movement.

2. A shaft coupling comprising two parallel spaced members or disks provided on their inner faces with opposed pockets of truncated conical form and rubber balls extending across the space between said members and into the pockets therein; the balls being free to rotate in the outer larger ends of the pockets and acting under a shearing action to cushion the coupling under rotary movement and acting under compression to cushion the members under a thrust movement.

In testimony whereof, I affix my signature.

RICHARD R. ROMNEY.